United States Patent [19]

Lankau

[11] Patent Number: 5,399,816

[45] Date of Patent: Mar. 21, 1995

[54] SEISMIC SOURCE

[75] Inventor: Henry J. D. Lankau, Rijswijk, Netherlands

[73] Assignee: Shell Oil Company, Houston, Tex.

[21] Appl. No.: 153,717

[22] Filed: Nov. 17, 1993

[30] Foreign Application Priority Data

Dec. 2, 1992 [EP] European Pat. Off. ............ 92203730

[51] Int. Cl.⁶ ................................................ G01V 1/40
[52] U.S. Cl. ...................................... 181/106; 181/119
[58] Field of Search ........................ 181/106, 113, 119; 367/911

[56] References Cited

U.S. PATENT DOCUMENTS

| | | | |
|---|---|---|---|
| 3,221,833 | 12/1965 | Malmberg | 181/106 |
| 3,993,974 | 11/1976 | Silverman et al. | 367/36 |
| 4,252,209 | 2/1981 | Silverman | 181/106 |
| 4,421,198 | 12/1983 | Miller | 181/121 |
| 4,648,478 | 3/1987 | Dedole et al. | 181/106 |
| 4,754,443 | 6/1988 | Chelminski | 367/145 |
| 4,923,030 | 5/1990 | Meynier | 181/106 |

FOREIGN PATENT DOCUMENTS

0182300A2  5/1986  European Pat. Off.

OTHER PUBLICATIONS

Foreign Search Report dated Mar. 9, 1994.

Primary Examiner—Ian J. Lobo
Attorney, Agent, or Firm—Fred S. Reynolds

[57] ABSTRACT

A subsurface seismic source for generating seismic waves comprises a fluid supply conduit section conducting fluid downward and having a seat for receiving a blocking body transported by said fluid. Said body blocks the fluid through said section when forced against said seat by said mud. At least one piston chamber is arranged adjacent to and connected with said section, has in one end wall at one end an opening to said section above said blocking body when forced against said seat, and comprises a biased piston closing said chamber at the other end and being driven to the corresponding other end wall when the blocking body is forced against said seat. Said blocking body is forced through said seat at a predetermined mud pressure level, thereby releasing said piston, the piston colliding against the one end wall and generating seismic waves.

17 Claims, 2 Drawing Sheets

SEISMIC SOURCE

BACKGROUND OF THE INVENTION

1. Field of the Invention

The present invention relates to a method for generating subsurface seismic waves, and to a source for carrying out said method. More particularly, the invention relates to using a fluid and a blocking body to generate seismic waves.

2. Description of the Related Art

One method and source for using a fluid and a blocking body to generate seismic waves is taught in U.S. Pat. No. 3,993,974. The method identified in that patent comprises:
 inserting a blocking body into a fluid supply conduit, arranged subsurface and conducting a fluid downward;
 enabling the fluid flow to carry said blocking body downward and forcing said body against a seat in a subsurface supply conduit section, thereby blocking the fluid; and
 continuing the fluid flow, thereby rising the fluid pressure until said body is forced through said seat, resulting in generating seismic waves.

In particular, a frangible object is inserted into the drill pipe arranged in a borehole being drilled. Subsequently said object is carried down through said pipe by the mud stream until the opening from the pipe to the bit is reached. Then the opening is blocked. By said blocking, the pressure inside the pipe will rise to a certain level at which the object will shatter and crumble into many pieces. Thereupon the compressed liquid will explosively expand through the openings in the bit in shock wave fashion and elastic or seismic waves are generated and are subsequently propagated through the subsurface formation.

Although, for example, geophones at the earth's surface will pick up signal components from said seismic waves, said signals, however, are substantially spread in time by said shattering and crumbling. This will cause unclearness both as to departure/arrival features of said waves and the ability to distinguish said signals from bit signals and further noise. Moreover, signals thus obtained are not reproducible. It may be clear that such signals are very difficult to be handled in order to arrive at unique subsurface formation mapping.

SUMMARY OF THE INVENTION

Therefore it is a main object of the present invention to arrive at a method and a seismic source for carrying out a method for generating seismic waves which are reproducible and can be distinguished clearly from background noise and perturbation signal components.

It is a further object of this invention to have a method and a source for generating seismic waves in a desired direction.

Therefore in accordance with the present invention the above method is improved, in that, simultaneously with blocking the fluid, at least one biased piston is driven to an end wall of a piston chamber adjacent to and connected with said supply conduit section above said blocking body; and when said blocking body is forced through said seat, said piston is released, the piston colliding against the end wall opposite to the above said end wall and generating seismic waves.

Furthermore, the source for carrying out the above method further comprises a piston chamber, arranged adjacent to said supply conduit section, having in one end wall at one end an opening to said section above said body when said body is forced against said seat, and comprising a biased piston closing said chamber at the other end and being driven to the corresponding other end wall when the blocking body is forced against said seat, said body being forced through said seat at a predetermined fluid pressure level, thereby releasing said piston, the piston colliding the one end wall and generating seismic waves.

In a further embodiment of the present invention a drill pipe for conducting mud downward is used, and either blocking body or seat, or even both are made of resilient material, such as polytetrafluoroethylene (also known as TEFLON, a trade mark of Du Pont (UK) Ltd.) or rubber.

In yet a further embodiment, blocking body and seat are a ball-ring combination. In a preferred embodiment a compression spring biased piston is driven substantially downward, upward, or laterally.

Advantageously, the above method and source are applied during drilling a borehole. Even the application in under water conditions has appeared to give advantageous results as both compressional waves and shear waves can be generated.

These and other objects and advantages of the present invention will become apparent to those of skill in the art after having read the following detailed description of the preferred embodiments which are contained herein and illustrated by the various figures.

The invention encompasses the heretofore described embodiments as well as other embodiments as are described and as will be apparent to those of skill in the art.

BRIEF DESCRIPTION OF THE DRAWINGS

The invention will now be described by way of example in more detail with reference to the accompanying drawings, wherein.

DESCRIPTION OF EMBODIMENTS

Figure 1:
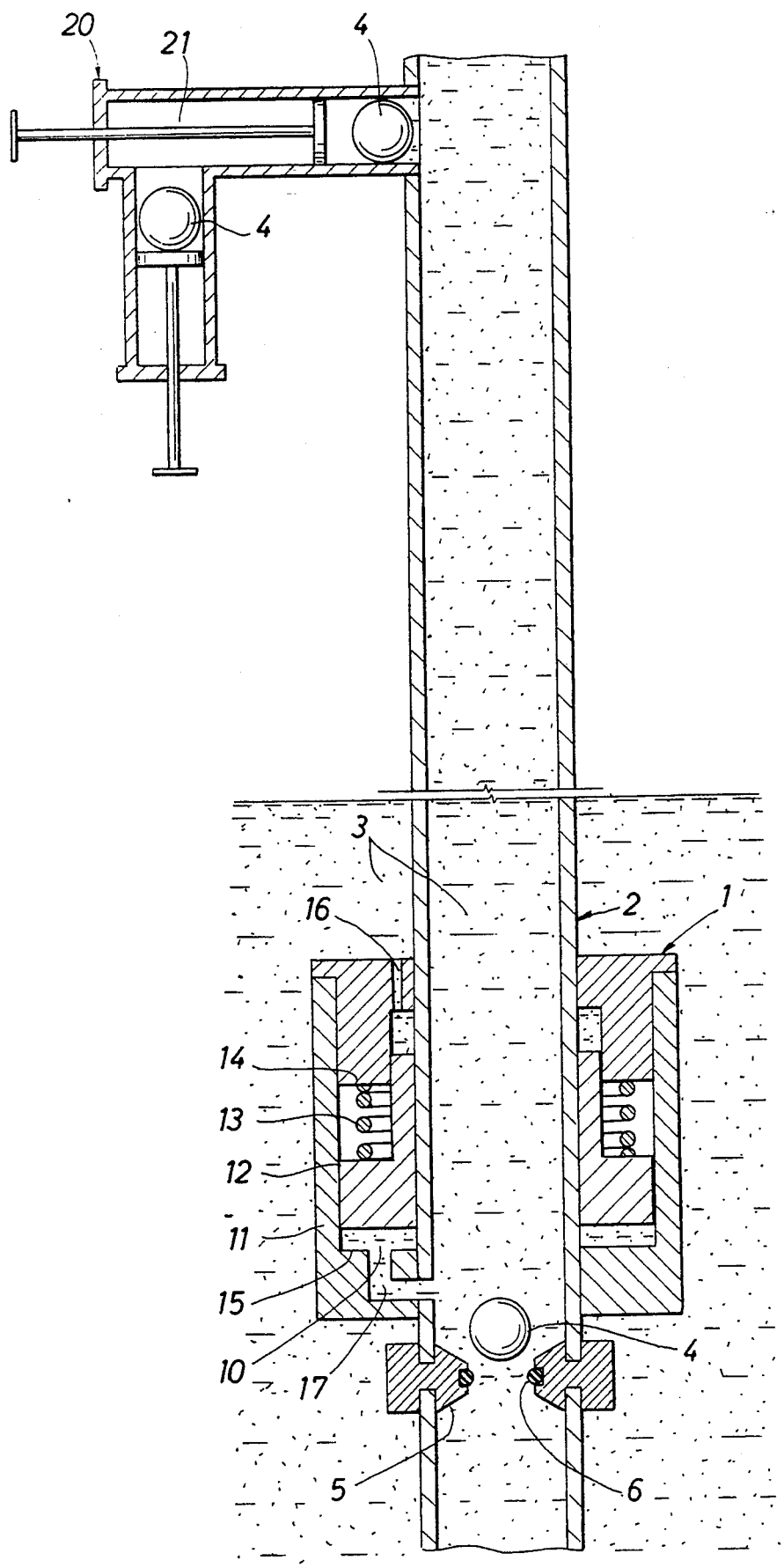
FIG. 1 shows a cross-section of one embodiment of an apparatus in accordance with the present invention.

In FIG. 1 a cross-section of a subsurface seismic source 1 of the present invention is shown connected to a drill pipe section 2 as part of a drill pipe from the earth's surface to a downhole location where a drill bit is operating. The downhole location may also be a subsea location, whereas, instead of a drill pipe for drill bit purposes, any other fluid supply conduit may be employed. Within pipe section 2 in this figure, mud 3 is flowing under pressure from a surface location. Mud 3 is also shown outside and surrounding the seismic source 1 and pipe section 2.

In order to obtain the pressure rising/pressure releasing-feature of the present invention a blocking body 4 is inserted into the drill pipe at a surface location. The blocking body 4 will be transported by the fluid, in particular the mud, and will be stopped at a seat 5, arranged as a narrowing in said drill pipe section. Advantageously, in this particular embodiment, the seat 5 has the form of a ring, whereas the blocking body 4 is a ball. Either said body 4 or said seat 5, or both, can be made of resilient material, such as TEFLON or rubber, or can comprise an outer part or outer layer of said materials. In addition in this embodiment, the seat advantageously comprises an O-ring 6 of resilient material. However, in other embodiments, the blocking body can also be made of a frangible material.

As shown in FIG. 1, one piston chamber 10 is coupled to said drill pipe section 2. In this particular embodiment, the piston chamber 10 surrounds the drill pipe section 2. In other embodiments, a plurality of separated piston chambers could be arranged about the circumference of the pipe. Returning to the embodiment of FIG. 1, said chamber 10 comprises a housing 11, within which a piston 12 which in this embodiment also surrounds the pipe is biased by means of a compression spring 13 against one end wall 14, and after releasing, the piston 12 is enabled to move to an opposite other end wall 15. A piston, as employed here, is considered a means which separates two spaces and which is movable by a pressure or force difference over said means. Said one end wall 14 is connected to the fluid or mud outside said drill pipe section 2 by means of a channel 16. At the other side of said piston chamber 10 an opening 17 is provided through which pressurized fluid or mud 3 can drive the piston 12 against its bias to said one end wall 14. Said opening 17 is arranged at least slightly above the blocking body 4 when forced against seat 5. Thus the same pressure is presented vis-à-vis said blocking body 4 and said piston 12.

Dependant on the source specifics desired, the compression spring 13 is made of any suitable metal or composite material which has an adequate spring rate with respect to the chosen diameter of the opening 17.

Further to the above-mentioned embodiment the piston can be biased also pneumatically or hydraulically. In such a configuration in an enclosed space without a channel 16 between end wall 14 and said piston 12, a suitable gas or fluid is employed as a bias means. Correspondingly initial and final gas or fluid pressures, respectively at starting of rising the pressure and at firing the source, are chosen.

At or near the earth's surface, a ball supply device 20 is provided. By means of a pusher 21 for inserting a blocking body, a ball 4 is put from a ball supply channel into the drill pipe where the fluid flow will transport said ball.

Figure 2:
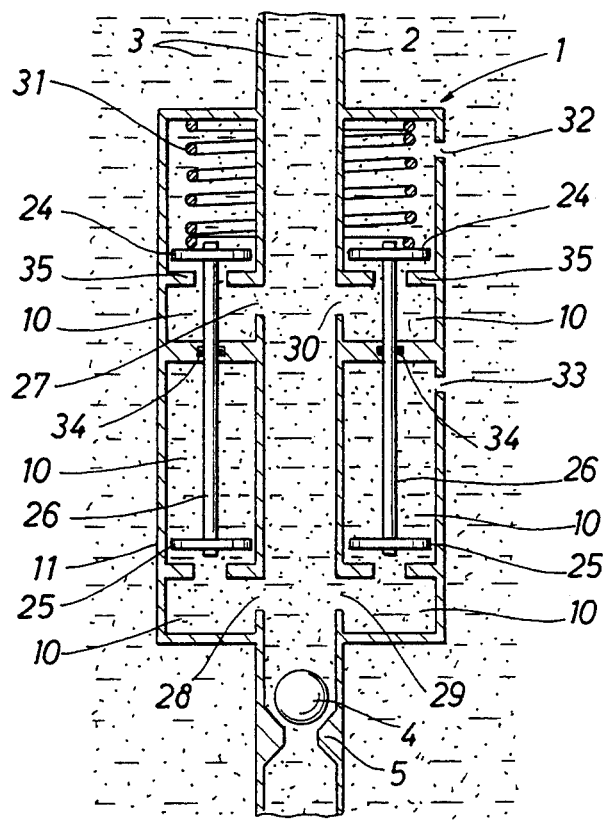
FIG. 2 shows a cross-section of a further embodiment of a seismic source in accordance with the present invention.

In FIG. 2, a cross-section of a further embodiment of a seismic source 1 in accordance with the present invention is shown. An annular piston chamber 10 is connected to drill pipe section 2.

Housing 11 comprising said chamber 10 extends circumferentially around said drill pipe section 2. As explained hereinbefore, a blocking body 4 is transported by a stream of mud 3 to a seat 5.

In this embodiment, two pistons 24 and 25, extending as bodies having a ring form and housed in annular spaces, are coupled by means of one or more axis means 26 for ensuring the pistons move with respect to the axis of the drill pipe 2. After blocking body 4 is stopped, mud pressure is built up. Said pressure is exerted through openings 27, 28, 29 and 30 and piston chamber 10 upon said pistons 24 and 25. Said coupled pistons are biased by a compression spring 31. Channels 32 and 33 are provided in order to equalize the fluid pressure of the mud at the bias side of said pistons to the fluid pressure of the mud surrounding the pipe section 2. Moreover, in order to seal the passage for the axis means 26 from mud surrounding the pipe section 2, sealing means 34 are provided. For example, the sealing means in this embodiment are O-rings 34.

When the source of this embodiment is fired, preferably, the piston making contact with the bias means will collide against the corresponding other end wall 35. Thereby possible error signals caused by corresponding asynchronous collisions of the respective pistons are avoided.

It may be clear to those skilled in the art that the embodiment according to FIG. 2 enables storage of more power in the biased piston arrangement just before firing compared to the embodiment of FIG. 1.

Provided that accurate piston driving control is foreseen a modified piston arrangement may comprise a set of colliding pistons, thus enabling signal modelling.

The method of the present invention is explained in more detail with reference to FIG. 3.

Figure 3:
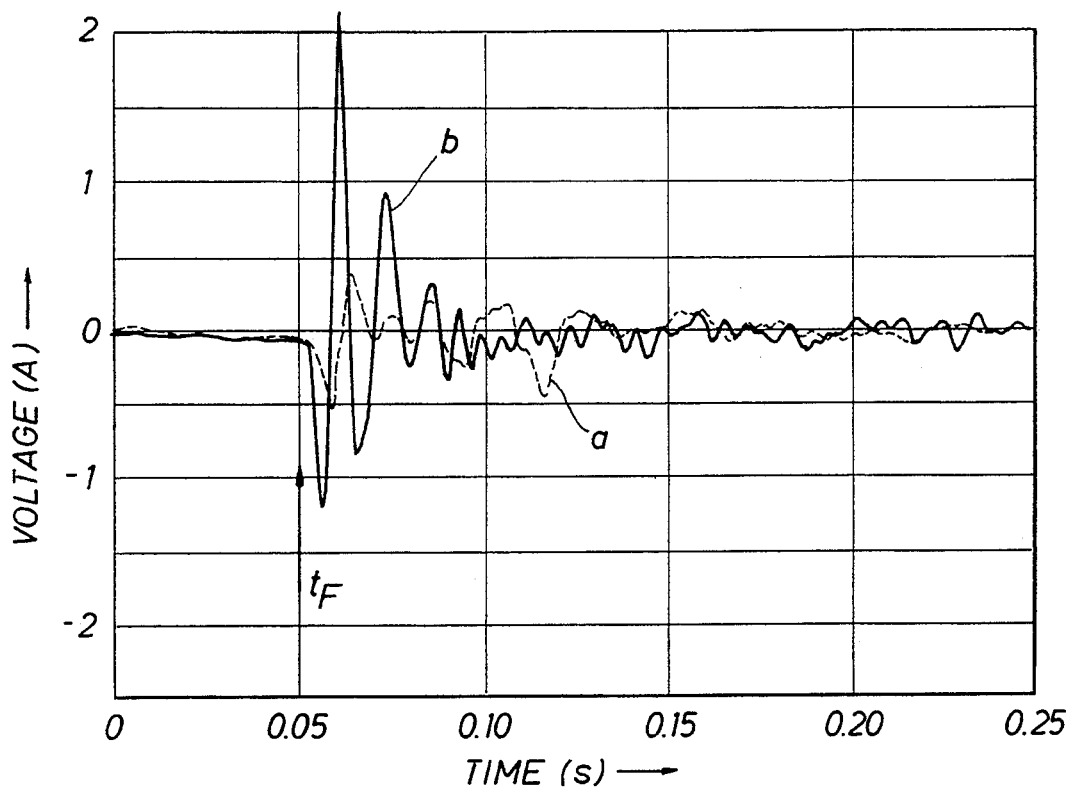
FIG. 3 shows results of experiments carried out following the method of the prior art and following the method of the present invention as shown in FIG. 1 respectively.

In FIG. 3 two experiments a and b are represented in an amplitude-time diagram. Conventionally, the amplitudes A are recorded and presented as voltages in volt units.

Said two experiments comprise rising water pressure in a pipe arranged about 2 meters vertically into the underground, and picking up the signal by a geophone at the earth surface, 50 cm away from the pipe, when the ball was forced through the seat.

The above-mentioned experimental set-up, involving said pipe and one piston chamber coupled thereto, is similar to the embodiment shown in FIG. 1 and had a total mass of 124 kg, 120 kg for the piston housing and 4 kg for the piston comprised therein. The ball forced through said seat had a diameter of 32 mm. The firing pressure was 12 bar.

In the one experiment represented by curve a, the piston biased with a compression spring was blocked. Thus, when firing the ball at time $t_F$, only a signal representing the shock of the whole set-up, caused by the expanding liquid, results. This experiment is considered exemplary for and comparable with the set-up of U.S. Pat. No. 3,993,974, wherein only the ball action is employed.

In the other experiment represented by curve b, the biased piston was unblocked, and when fired at time $t_F$ the piston was released in the downward direction and a spike-like signal resulting from the colliding piston was observed.

It may be clear from the above results that the method and apparatus in accordance with the present invention permit generating seismic signals having a substantially increased amplitude and well defined time characteristics.

In a further application of the present invention, besides downward release movement of the piston, upward, or even lateral movement can be applied.

As an example of the latter case, the source is embedded within the sea bottom formation. In order to generate shear waves, the source is arranged such that the piston is driven and released substantially horizontally, i.e. in a substantially parallel direction to the sea bottom surface.

Various modifications of the present invention will become apparent to those skilled in the art from the foregoing description and accompanying drawings.

For example, further performance optimization may be obtained by matching piston mass and bias characteristics. Such modifications are intended to fall within the scope of the appended claims.

What is claimed:

1. A method for generating subsurface seismic waves, the method comprising:

inserting a blocking body into a fluid supply conduit arranged subsurface and conducting a fluid downward;

enabling the fluid flow to carry said blocking body downward and forcing said blocking body against a seat in a subsurface supply conduit section, thereby simultaneously blocking the fluid and driving at least one biased piston to an end wall of a piston chamber adjacent to and connected with said supply conduit section above said blocking body; and continuing the fluid flow, thereby raising the fluid pressure until said blocking body is forced through said seat, resulting in releasing said piston, the piston colliding with the end wall opposite to the above said end wall and generating seismic waves.

2. The method as claimed in claim 1, wherein the fluid supply conduit is a drill pipe.

3. The method as claimed in claim 2, wherein the fluid is mud.

4. A subsurface seismic source for generating seismic waves, the source comprising:

a fluid supply conduit section conducting fluid downward and having a seat for receiving a blocking body transported by said fluid, said body blocking the fluid flow through said section when said body is forced against said seat by said fluid; and at least one piston chamber, arranged adjacent to said section, having in one end wall at one end an opening to said section above said body when said body is forced against said seat, and comprising a biased piston closing said chamber at the other end.

5. The source as claimed in claim 4, wherein said fluid supply conduit section is a drill pipe section.

6. The source as claimed in claim 4, wherein the blocking body is of a resilient material.

7. The source as claimed in claim 6, wherein the resilient material is rubber.

8. The source as claimed in claim 6, wherein the resilient material is polytetrafluoroethylene.

9. The source as claimed in claim 4, wherein the seat is of a resilient material.

10. The source as claimed in claim 9, wherein the resilient material is rubber.

11. The source as claimed in claim 9, wherein the resilient material is polytetrafluoroethylene.

12. The source as claimed in claim 4 wherein the blocking body and seat form a ball-ring combination.

13. The source as claimed in claim 4, wherein the piston is biased by means of a compression spring.

14. The source as claimed in claim 4, wherein the piston is driven substantially downward.

15. The source as claimed in claim 4, wherein the piston is driven substantially upward.

16. The source as claimed in claim 4, wherein the piston is driven substantially laterally.

17. The source as claimed in claim 4 wherein the fluid is mud.

* * * * *